US009031206B2

United States Patent
Williams et al.

(10) Patent No.: US 9,031,206 B2
(45) Date of Patent: May 12, 2015

(54) UNUSUAL EVENT DETECTION IN A TELECOMMUNICATIONS NETWORK

(71) Applicant: Metaswitch Networks Ltd, Enfield (GB)

(72) Inventors: Matthew Williams, London (GB); Michael Jeffrey Evans, High Wycombe (GB); Alex Hockey, London (GB); Martin Young, Dallas, TX (US)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 14/205,271

(22) Filed: Mar. 11, 2014

(65) Prior Publication Data

US 2014/0254772 A1   Sep. 11, 2014

(30) Foreign Application Priority Data

Mar. 11, 2013  (GB) .................................. 1304336.9

(51) Int. Cl.
  *H04M 1/24* (2006.01)
  *H04M 3/08* (2006.01)
  *H04M 3/22* (2006.01)
  *H04M 3/24* (2006.01)

(52) U.S. Cl.
  CPC ...................................... *H04M 3/24* (2013.01)

(58) Field of Classification Search
  CPC ..... H04M 3/2281; H04M 7/006; H04M 3/22; H04M 3/2227; H04M 3/2236; H04M 3/51; H04M 15/41; H04M 3/2209; H04M 3/56; H04M 15/00; H04M 3/36
  USPC ............... 379/32.01, 112.01, 112.06, 114.14, 379/133, 189
  See application file for complete search history.

(56) References Cited

U.S. PATENT DOCUMENTS

| | | | |
|---|---|---|---|
| 8,625,757 B1 * | 1/2014 | Karpov et al. ........... | 379/112.06 |
| 2009/0132865 A1 | 5/2009 | Meng et al. | |
| 2012/0275574 A1 * | 11/2012 | Ala-Rami et al. ......... | 379/32.01 |

FOREIGN PATENT DOCUMENTS

EP       1708414 A1    10/2006

OTHER PUBLICATIONS

IEEE Asia-Pacific Services Computing Conference, APSCC 2008, pp. 1358-1363, "The study of intrusion prediction based on HsMM", Zhengdao et al. Accession No. 10472091 ; XP031423532.

(Continued)

*Primary Examiner* — Quoc D Tran
(74) *Attorney, Agent, or Firm* — EIP US LLP

(57) ABSTRACT

Measures for detecting unusual communication session events in a telecommunications network. A Markov model for events occurring in communication sessions conducted in the network is maintained. The maintaining includes assigning a probability of occurrence metric to a plurality of event sequences in the conducted communication sessions. In response to a given sequence of communication session events being assigned a probability of occurrence metric which exceeds a predetermined threshold, an unusual communication session event alert in association with the given sequence is triggered.

24 Claims, 4 Drawing Sheets

(56) References Cited

OTHER PUBLICATIONS

Journal of Systems and Electronics, Jun. 2008, vol. 19, No. 3, pp. 598-605, "Intrusion detection based on system calls and homogenous Markov chains", Xinguang T. et al. Accession No. 10353445; XP022936401.

IEEE Transactions on Reliability, vol. 53, No. 1, Mar. 2004, "Robustness of the Markov-Chain model for cyber-attack detection", N. Ye et al. Obtained from: http://enpub.fulton.asu.edu/ye/published_journal_papers/ye_49.pdf.

* cited by examiner

UNUSUAL EVENT DETECTION IN A TELECOMMUNICATIONS NETWORK

CROSS-REFERENCE TO RELATED APPLICATIONS

This application claims priority under 35 U.S.C. §119(a) to GB Patent Application No. 1304336.9, filed Mar. 11, 2013, the entire content of which is hereby incorporated by reference.

BACKGROUND OF THE INVENTION

The present disclosure relates to event detection. In particular, but not exclusively, the present disclosure relates to detecting unusual communication session events in a telecommunications network.

Telecommunications networks are commonly employed to provide telecommunications services to end-users. These telecommunications services are generally orientated around communication sessions such as telephone calls and/or web services. These communication sessions include a series of "events." For example, a call includes a "The calling subscriber has dialed some digits" event and probably a "The called subscriber is ringing" event, and maybe a "The called subscriber is busy" event.

Known service monitoring/troubleshooting network nodes (or 'service assurance network nodes') such as Metaswitch's™ Service Assurance Server™ (SAS) receive and store communication session events. Such network nodes typically have a user interface accessible via the Internet or other network (a 'web interface') by which administrators, support engineers or suchlike can search for specific communication sessions by various criteria (such as subscribers involved, time of day, etc.) and then display all the events generated on that communication session. When a service provider receives a complaint from a subscriber, the service provider can look up the failure and this is often sufficient to see why the communication session failed or contained errors. The service provider can then either explain to the subscriber what they did wrong, or fix their system if it is a misconfiguration.

Known network node products such as Metaswitch's™ Call Feature Server™ (CFS), Universal Media Gateway™ (UMG), Enhanced Application Server™ (EAS) and Perimeta™ Session Border Controller (SBC) each support generation of communication session events. Sometimes a communication session can span multiple of these products. For example, a communication session might come in via Perimeta SBC, be verified and passed on to CFS, which decides to set up a call and programs the UMG to handle media. Each of the systems generates a separate sequence of events, even though such events are part of the same communication session. The separate sequences of events can be referred to as "trails". Such trails can be correlated together into a "trail group", and it is this trail group that will typically be displayed to the administrator, support engineer or suchlike in a web user interface of a service monitoring network node.

FIG. 1 is a composite screenshot illustrating an example display of trail groups and communication session events. The upper-left image shows a single communication session, with a list of all events in a trail group in the top half and the details of a specific communication session event in the lower half. The lower-right image shows the list of all trail groups that match some example search criteria.

Whilst a service monitoring network node can be useful for troubleshooting communication session errors, a large trail group can contain hundreds of communication session events and it can be hard to find the interesting ones for error detection purposes, particularly for inexperienced service providers or support engineers.

SUMMARY

According to a first embodiment, there is a method of detecting unusual communication session events in a telecommunications network, the method comprising: maintaining a Markov model for events occurring in communication sessions conducted in the network, the maintaining comprising assigning a probability of occurrence metric to a plurality of event sequences in the conducted communication sessions; and in response to a given sequence of communication session events being assigned a probability of occurrence metric which exceeds a predetermined threshold, triggering an unusual communication session event alert in association with the given sequence.

According to a second embodiment, there is apparatus for use in detecting errors in communication sessions in a telecommunications network, the apparatus comprising at least one processor, and at least one memory including computer program code, the at least one memory and the computer program code being configured to, with the at least one processor, cause the apparatus at least to: maintain a Markov model for events occurring in communication sessions conducted in the network, the maintaining comprising assigning a probability of occurrence metric to a plurality of event sequences in the conducted communication sessions; and in response to a given sequence of communication session events being assigned a probability of occurrence metric which exceeds a predetermined threshold, trigger an unusual communication session event alert in association with the given sequence.

According to a third embodiment, there is a computer program product comprising a non-transitory computer-readable storage medium having computer readable instructions stored thereon, the computer readable instructions being executable by a computerized device to cause the computerized device to perform a method for detecting errors in communication sessions in a telecommunications network, the method comprising: maintaining a Markov model for events occurring in communication sessions conducted in the network, the maintaining comprising assigning a probability of occurrence metric to a plurality of event sequences in the conducted communication sessions; and in response to a given sequence of communication session events being assigned a probability of occurrence metric which exceeds a predetermined threshold, triggering an unusual communication session event alert in association with the given sequence.

Further features of embodiments will become apparent from the following description of preferred embodiments of the disclosure, given by way of example only, which is made with reference to the accompanying drawings.

DETAILED DESCRIPTION OF CERTAIN INVENTIVE EMBODIMENTS

Figure 2:
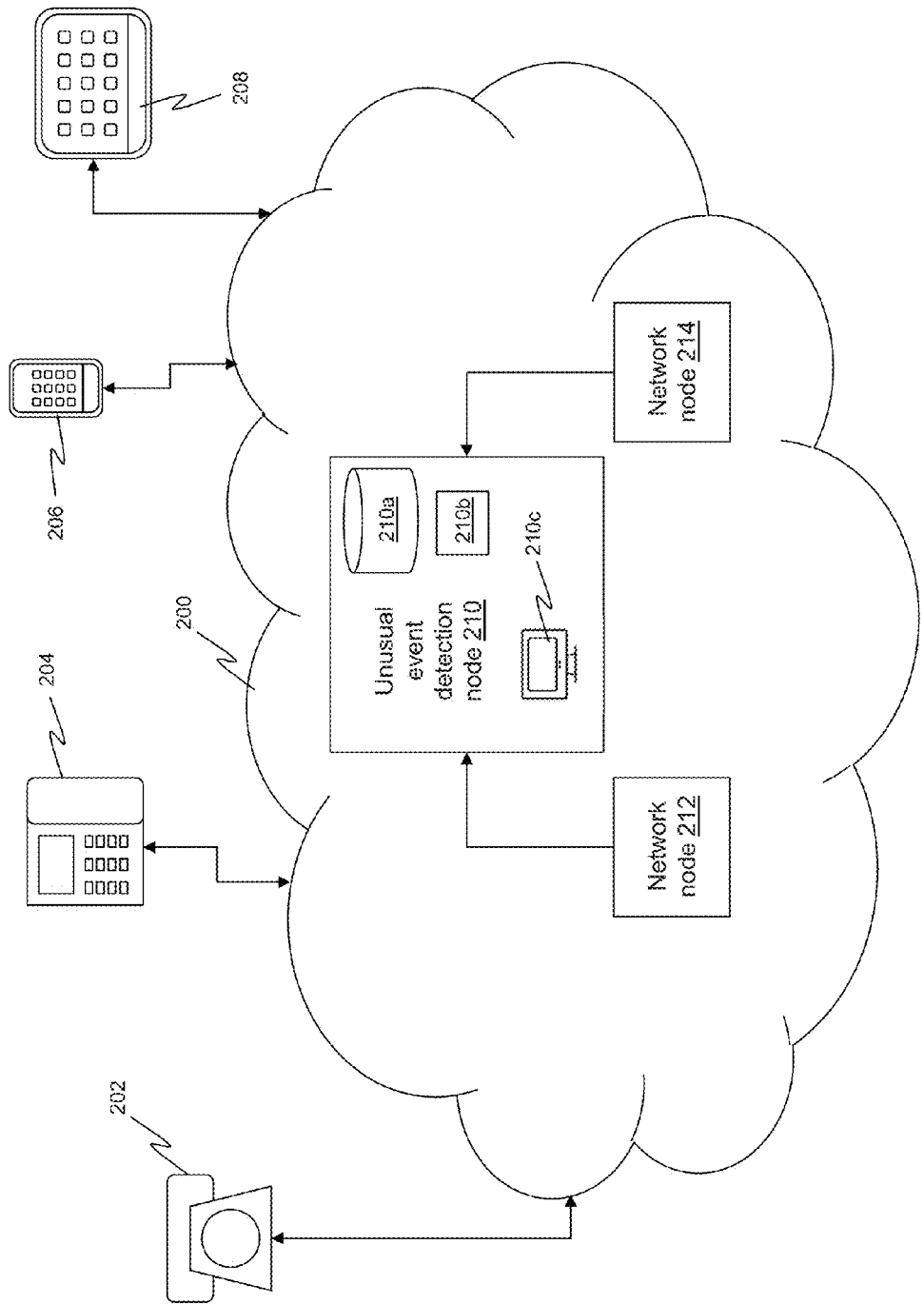
FIG. 2 shows a system diagram according to embodiments.

FIG. 2 shows a system diagram of a telecommunications network 200 according to embodiments. In embodiments, telecommunications network 200 comprises one or more of the Internet, a mobile telephone network, and a Public Switched Telephone Network (PSTN).

Figure 1:
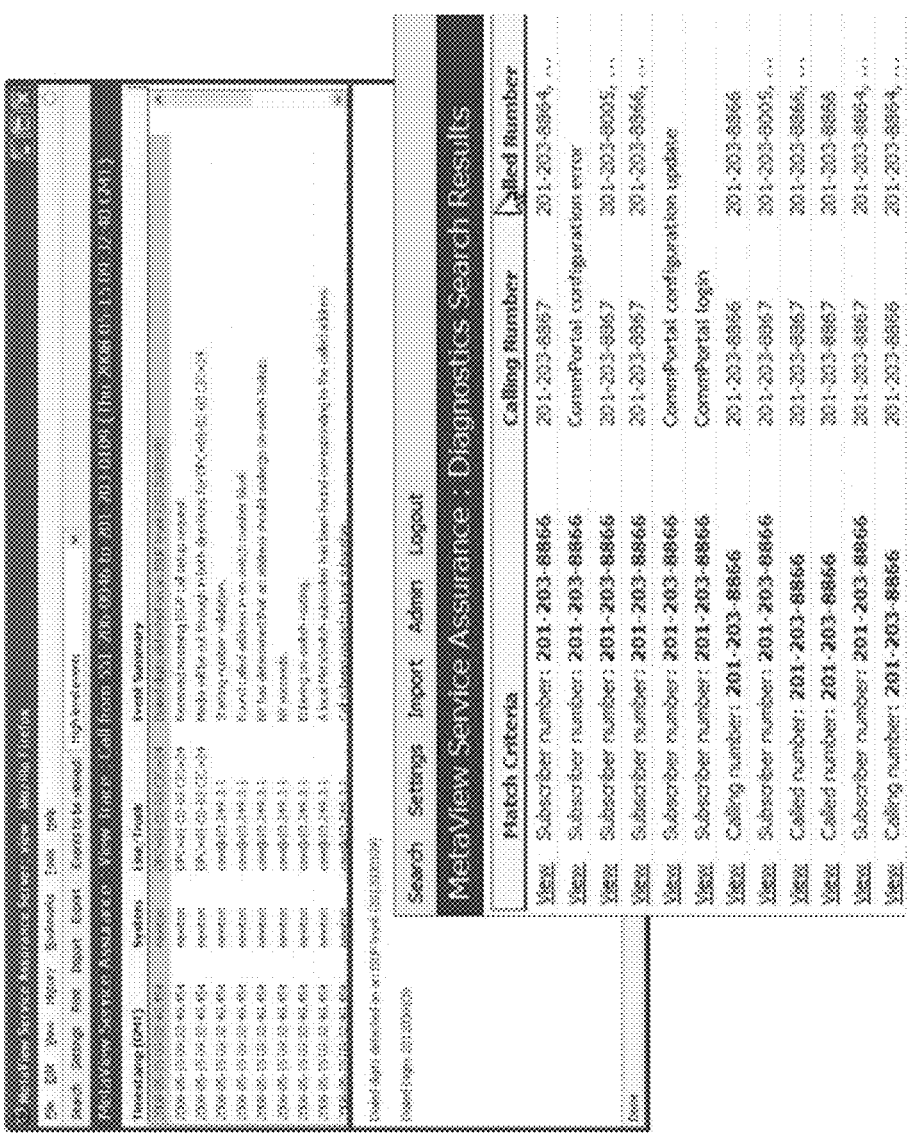
FIG. 1 shows a screenshot according to embodiments.

In embodiments, telecommunications network 200 includes a number of user devices 202, 204, 206, 208 between which users can conduct communication sessions such as telephone calls, video calls, chat sessions, etc. In the example of FIG. 1, user device 202 comprises an analogue telephone, user device 204 comprises a Session Initiation Protocol (SIP) telephone, user device 206 comprises a mobile (or 'cellular') telephone such as a so-called 'smartphone', and user device 208 comprises a tablet. In practice, other types of user device (not shown) could also be employed by users to communicate with each other.

In embodiments, telecommunications network 200 includes several network nodes 210, 212 and 214, which may comprise one or more of a softswitch, call agent, session border controller, SIP proxy, media gateway, application server, etc. Signaling and/or media data for communication sessions conducted between user devices in telecommunications network 200 may pass through one or more of network nodes 210, 212, 214, i.e. the signaling path and/or media path for communication sessions conducted in telecommunications network 200 may comprise one or more of network nodes 210, 212 and 214.

Network node 210 comprises an unusual communication session event detection node at which embodiments of the present disclosure may be implemented. In embodiments, unusual communication session event detection node 210 comprises a database 210a, a processor 210b, and/or a user interface 210c. Processor 210b carries out the main data processing functions of embodiments.

Embodiments comprise measures, including methods, apparatus and computer software for use in detecting unusual communication session events in a telecommunications network. A Markov model for events occurring in communication sessions conducted in the network is maintained by unusual communication session event detection node 210; content data for the Markov model may be stored in database 210b. The maintaining comprises assigning a probability of occurrence metric to a plurality of event sequences in the conducted communication sessions. In response to a given sequence of communication session events being assigned a probability of occurrence metric which exceeds a predetermined threshold, an unusual communication session event alert in association with the given sequence is triggered.

Embodiments comprise, in response to a further sequence of communication session events being assigned a probability of occurrence metric which exceeds both the predetermined threshold and a further, different predetermined threshold, triggering a further unusual communication session event alert in association with the further sequence.

Embodiments comprise providing a user interface for displaying data associated with communication session events. In embodiments, the triggering comprises displaying data associated with the given sequence of communication session events differently to data associated with other communication session events via the user interface.

In embodiments, the triggering of the further unusual communication session event alert comprises displaying data associated with the further sequence of communication session events differently to data associated with the given sequence of communication session events and differently to data associated with other communication session events via the user interface.

Embodiments modify how communication session events are displayed via a user interface of unusual communication session event detection node 210 to highlight unusual events. More specifically, it highlights communication event sequences that are unusual. In embodiments, the "usual" sequence of events is automatically learnt to fit an individual service provider's call patterns. For example, a service provider whose customers are all cold-calling companies (and so only ever make outgoing calls) would highlight any incoming calls as unusual.

Figure 3:
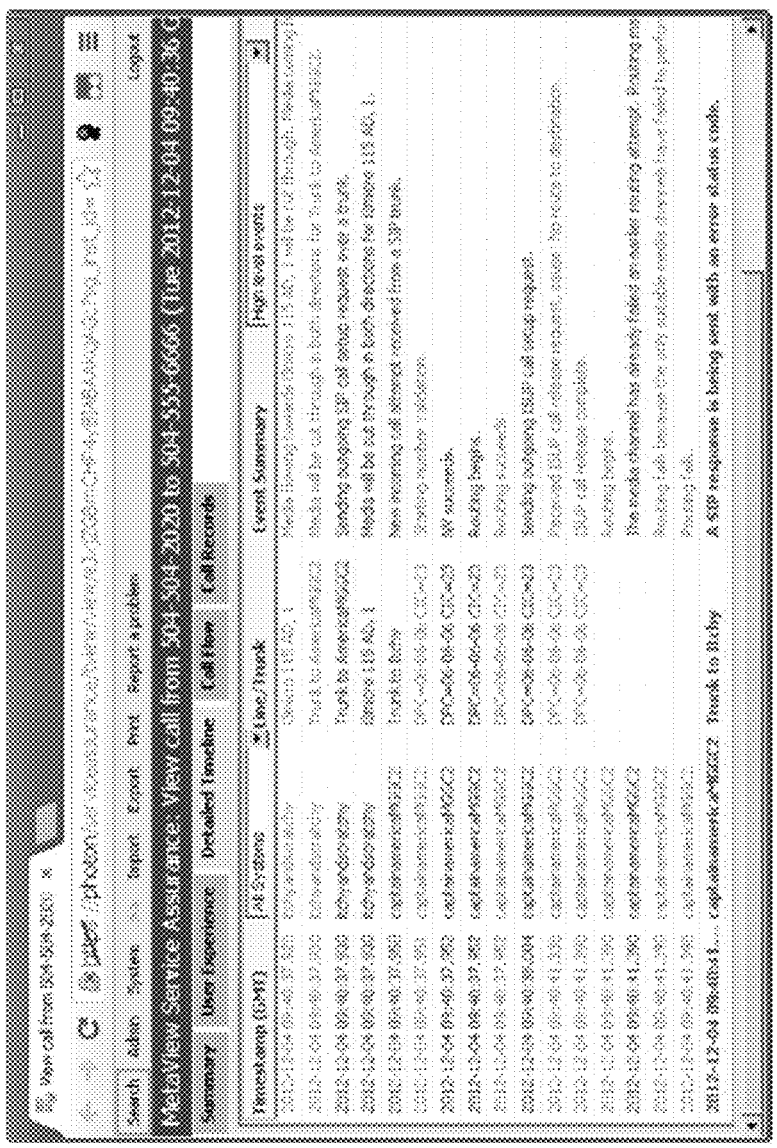
FIG. 3 shows a screenshot according to embodiments.

FIG. 3 shows a screenshot illustrating such highlighting. Events in grey very commonly follow their previous event (and so are probably not interesting from a service monitoring/troubleshooting perspective). Events in black generally follow their previous event. Events in red generally do not follow their previous event and red and bold events very rarely follow their previous event.

Note that the "previous events" referred to above are on a per-trail basis, not per-trail-group. This means that if, for example, CFS and Perimeta SBC network nodes are performing processing at the same time (and so their events are interleaved), the previous event of a CFS event would generally be another CFS event (and vice-versa). If the previous event of a CFS event was allowed to be a Perimeta SBC event, it is likely that this would just be down to a race condition and would incorrectly indicate a highly-unusual event (which would be confusing for the administrator or support engineer).

Known network assurance nodes receive communication session events over the network from other products and write them to a database, indexing on time and/or trail. Then, when the network assurance node is required to display communication session events, it queries this database and collects the trails up into trail groups.

Embodiments enhance such functionality by building a first-order Markov chain as communication session events are received over telecommunications network 200 and before they are written to a database such as database 210a. A first-order Markov chain works by tracking the probability of each event (Y) given the previous event (X) only. Embodiments implement this by keeping a running total of the number of times event X had been seen (a 1-dimensional array) and the number of times event Y had followed X (a 2-dimensional array). Calculating the probability of event Y given previous event X is then enabled by dividing the number of times event Y had followed X by the number of times event X had been seen.

In embodiments, the model is "aged" at periodic intervals by multiplying all the counts by a constant weighting factor (such as 90%). This means that the model keeps learning, giving the same weight to the most recent events and eventually forgetting about rare events that occurred a long time ago.

Embodiments comprise updating the content of the Markov model by applying a weighting factor over time. The weighting factor may be user-configurable, for example by an administrator or support engineer. The weighting factor may for example comprise a constant weighting factor with a value of 0.90. The weighting factor may be applied by applying a sliding window over the content of the Markov model.

In embodiments, the Markov model is aged by 90% every approximately 0.45 days. A constant weighting factor of 90% provides a good balance with respect to rounding errors, whereas a constant weighting factor of 95% may have too much of an effect on events that occur rarely—int(10*95%)

ends up still being 10, and hence not aged, while int(10*90%) obviously is aged. The approximately 0.45 days period provides a half-life of around 3 days (i.e. the significance of an event halves every 3 days). A half-life of around 3 days allows the system to return back to normal reasonably quickly after an outage, but longer or shorter periods could also be used. A longer period means that the system takes longer to adjust to changes (and hence continues to assert that unusual events are unusual even after they have been happening for a while). A shorter period means that the system responds more quickly (and hence responds to system-wide configuration changes by training to the new behavior more quickly). The constant weighting factor of 90% can be adjusted (along with the period) to reduce rounding errors further, or to improve accuracy if floating point numbers are employed for counters.

Fast ageing of the Markov model is good in that it adjusts to configuration changes quickly, whereas slow ageing is good in that it provides stability. In alternative embodiments, instead of employing a constant weighting factor, the Markov model is aged more quickly after a configuration change and aged less quickly when no configuration changes are occurring (i.e. a variable weighting factor is employed). In some embodiments, this is achieved by having a manual control on the unusual event detection node, whereas in other embodiments this is achieved by having a communication channel between the unusual event detection node and a configuration system (whether via the unusual event detection node polling the configuration system or the configuration system pushing notifications to the unusual event detection node).

In embodiments, the probability of occurrence metric comprises the probability given by the Markov model that the next event in a given sequence of two events follows the previous event in the given sequence of two events.

In embodiments, the probability of occurrence metric comprises the probability given by the Markov model that the next event in a given sequence of two events follows the previous event in the given sequence of two events divided by the average probability of all next events in the Markov model given the previous event in the given sequence of two events.

In embodiments, the probability of occurrence metric comprises the surprisal of the probability of the next event in a given sequence of two events given the previous event in the given sequence of two events divided by the entropy of the previous event in the given sequence of two events; the modified surprisal metric of such embodiments is referred to herein as an "adjusted surprisal".

In embodiments, when an administrator or support engineer requests display of events via user interface 210c, unusual communication session event detection node 210 checks the Markov model and, for each pair of event and previous event, finds the probability that the Markov model predicted (as described above) and then calculates its "surprisal" divided by the previous event's entropy (i.e. an "adjusted surprisal"). Surprisal is a measure of how surprised an observer would be to see a specific event following the previous event. Entropy is a measure of how surprised an observer would expect to be given the previous event but not knowing which specific event followed it.

The adjusted surprisal of embodiments controls how events are highlighted in user interface 210c. In embodiments, there are three thresholds to differentiate between uninteresting events in grey (adjusted surprisal<0.2), normal events in black (0.2<surprisal<2), interesting in red (2<surprisal<20) and really interesting in bold red (surprisal>=20). The predetermined threshold of embodiments may for example comprise a value of 2, whereas the predetermined threshold of embodiments may for example comprise a value of 20. In embodiments, unusual communication session events can comprise interesting and/or really interesting events.

Note that other embodiments may employ different thresholds levels; having threshold levels closer together mean that events are more readily considered unusual (at the cost of false-positives) and having threshold levels further apart means that fewer events will be considered unusual (along with fewer false positives).

In further embodiments, the threshold levels are implemented not as abrupt thresholds, but on a graduated scale such as a color gradient (for example such that events are colored more red or more grey on the user interface according to how unusual they are).

In embodiments, the Markov model comprises a first-order Markov chain. In embodiments, the Markov model comprises a higher than first-order Markov chain.

Embodiments employ a first-order Markov chain, meaning that only the single immediately-previous event is looked at to decide how likely the next event is to occur. Other embodiments employ a second- or third- (or higher) order Markov chain, meaning that more previous events would be looked at. Using higher-order chains might give a more accurate model but would take up more processing resources (for example central processing unit (CPU) resources in processor 210b) and memory and take longer to train (and hence be less adaptable to changes in call patterns).

Communication sessions such as business calls are much more common during business hours, and these might have a different pattern (for example be more likely to be international) from residential calls. Embodiments allow for this in the model by dividing the day into periods and maintaining separate Markov chains for each period. Embodiments then decide on the probability of an event by either picking that given event by the Markov chain corresponding to the nearest period or interpolating between the periods. Fitting the model more accurately would give fewer false positives but, as for higher-order chains, would take up more memory and take longer to train. In embodiments, the maintaining comprises maintaining a plurality of different Markov models for events occurring in communication sessions conducted in the network during different time periods.

Embodiments could divide subscribers into groups (e.g. residential, business) and build separate Markov models for each group. Again, such embodiments might produce fewer false positives but take more memory and time to train. In embodiments, the maintaining comprises maintaining a plurality of different Markov models for events occurring in communication sessions conducted between different groups of subscribers in the network.

In embodiments, when a new subscriber group (with a new Markov model) is created, an existing (similar) subscriber group is specified from which the Markov model can take its starting state. This means that it takes less time to train the Markov model as it would already be approximately correct. In embodiments, this is achieved by a configuration system notifying the unusual event detection node of the old and new subscriber groups, and the unusual event detection node copying the appropriate Markov model.

Embodiments comprise highlighting communication session events directly on the basis of the probability of the event given the previous event.

Embodiments comprise highlighting communication session events based on the ratio of the probability of the event given the previous event to the average probability of all the events that can follow the previous event.

Embodiments comprise highlighting communication session events based on the surprisal of the probability of the next event in a given sequence of two events given the previous event in the given sequence of two events divided by the entropy of the previous event in the given sequence of two events.

Embodiments comprise allowing thresholds for different highlighting levels to be adjustable by a user such as an administrator or support engineer.

Embodiments comprise building the Markov model as communication session event data arrives at unusual communication session event detection node 210, for example from network node 212 and/or network node 214, before such data is added to database 210a. This avoids extra database queries (and hence improves performance) but means that it is not possible to build the model based on historical data. Embodiments comprise receiving at least some of the communication session event data for maintaining the Markov model for at least some of the conducted communication sessions via the network as the conducted communication sessions occur. In embodiments, the communication session event data is received from a plurality of different network nodes in the network, for example network nodes 212 and 214.

Alternative embodiments comprise querying events out of database 210a and building the Markov model on that basis. Embodiments comprise retrieving at least some of the communication session event data for maintaining the Markov model from a historical communication session event database.

Further, alternative embodiments involve a hybrid approach where a Markov model is built as communication session event data arrives at unusual communication session event detection node 210, but also involve processing of historical data, for example in the background when CPU load on unusual communication session event detection node 210 is low.

In embodiments, one copy of the Markov model is maintained and used for displaying all communication session events, even historical ones. This means that if the "normal" sequence of events changes, old trails having unusual events may be displayed even though they were not unusual at the time the trail occurred.

Embodiments comprise saving a snapshot of the Markov model on a regular basis and, when displaying a historical call, using the Markov model that was dated nearest to that time for unusual communication session event detection purposes. Embodiments comprise storing snapshots of the content of the Markov model at periodic intervals; in such embodiments, displaying data associated with the given sequence of communication session events via the user interface comprises using the stored snapshot content of the Markov model which occurred closest in time to the given sequence of communication session events in relation to the triggering.

Alternative embodiments comprise calculating each communication session event's adjusted surprisal as the event data arrives at unusual communication session event detection node 210 and storing the event and the surprisal together in database 210a.

In embodiments, unusual communication session events within a trail group are highlighted. Alternatively, embodiments comprise, in response to the given sequence of communication session events being assigned a probability of occurrence metric which exceeds the predetermined threshold, triggering an unusual communication session alert in association with a given communication session in which the given sequence occurred; in such embodiments, the triggering of an unusual communication session alert comprises displaying data associated with the given communication session differently to data associated with other communication sessions via the user interface.

Embodiments comprise calculating the average adjusted surprisal over all the communication session events in each trail group and using this to identify which communication sessions deviate most from the standard model. Embodiments comprise calculating the average of the probability of occurrence metrics assigned to all events sequences in a further communication session, and in response to the calculated average exceeding a yet further predetermined threshold, triggering a further unusual communication session alert in association with the further communication session; in such embodiments, the triggering of the further unusual communication session alert comprises displaying data associated with the further unusual communication session differently to data associated with other communication sessions via the user interface.

Service providers often want to know if their system is behaving abnormally. Traditional error logs and alarms (which trigger when things actually go wrong) are useful, but sometimes these are not sensitive enough. Consider, for example, if a subscriber's account has been compromised and used to make large numbers of premium rate calls. This is not an error (it is legitimate behavior), but is most probably something that the service provider would want to know about. Embodiments implement such by saving a snapshot of the Markov model on a regular basis and comparing this with the master Markov model as it is updated. Embodiments comprise calculating the average difference in adjusted surprisal over all pairs of previous and following events which produces a metric which can be meaningfully reported and on which a threshold can be set and an alarm raised if the system exceeds such.

Embodiments comprise storing snapshots of the content of the Markov model at periodic intervals, calculating, for all pairs of two events in a given stored snapshot and the maintained Markov model, the average difference between the surprisal of the probability of the next event in each sequence of two events given the previous event in each sequence of two events divided by the entropy of the previous event in each sequence of two events, and in response to the calculated average difference exceeding a given predetermined threshold, triggering an abnormal network behavior alert for the network.

However, simply raising an alarm when something unusual happens can be insufficient because a service provider needs to know what has changed. Therefore, in further alternative embodiments, instead of calculating the average difference in adjusted surprisal over all pairs of previous and following events, those following events that have the highest difference in surprisal are identified and displayed via user interface 210c. Embodiments comprise identifying a subset of event sequences in the plurality of event sequences for which the assigned probability of occurrence metric is higher than other event sequences, and triggering a further abnormal network behavior alert for the network, wherein the triggering of a further abnormal network behavior alert comprises only displaying data associated with event sequences in the subset via the user interface.

Figure 4:
FIG. 4 shows a word cloud diagram according to embodiments.

Such further alternative embodiments can be implemented as a displayed list of communication session events. In embodiments, this is implemented as a "word cloud" (or "word soup" or "tag soup") where the size of the text is proportional to the importance of the word/phrase, as shown in FIG. 4. Embodiments comprise displaying data associated with event sequences in the subset via the user interface using a word cloud diagram.

The above embodiments are to be understood as illustrative examples of the disclosure. Further embodiments of the disclosure are envisioned.

Embodiments described above employ use of a Markov model to model communication session events; in further embodiments, other types of suitable statistical model are employed.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of detecting unusual communication session events in a telecommunications network, the method comprising:
   maintaining a Markov model for events occurring in communication sessions conducted in the network, the maintaining comprising assigning a probability of occurrence metric to a plurality of event sequences in the conducted communication sessions;
   updating the content of the Markov model by applying a weighting factor over time; and
   in response to a given sequence of communication session events being assigned a probability of occurrence metric that exceeds a predetermined threshold, triggering an unusual communication session event alert in association with the given sequence.

2. A method according to claim 1, wherein the probability of occurrence metric comprises the probability given by the Markov model that the next event in a given sequence of two events follows the previous event in the given sequence of two events.

3. A method according to claim 1, wherein the probability of occurrence metric comprises the probability given by the Markov model that the next event in a given sequence of two events follows the previous event in the given sequence of two events divided by the average probability of all next events in the Markov model given the previous event in the given sequence of two events.

4. A method according to claim 1, wherein the probability of occurrence metric comprises the surprisal of the probability of the next event in a given sequence of two events given the previous event in the given sequence of two events divided by the entropy of the previous event in the given sequence of two events.

5. A method according to claim 1, wherein the Markov model comprises a first-order Markov chain.

6. A method according to claim 1, wherein the weighting factor is user-configurable.

7. A method according to claim 1, wherein the weighting factor is a constant weighting factor of 0.90.

8. A method according to claim 1, further comprising: receiving at least some of the communication session event data for maintaining the Markov model for at least some of the conducted communication sessions via the network as the conducted communication sessions occur.

9. A method according to claim 8, wherein the communication session event data is received from a plurality of different network nodes in the network.

10. A method according to claim 1, further comprising: retrieving at least some of the communication session event data for maintaining the Markov model from a historical communication session event database.

11. A method according to claim 1, further comprising: providing a user interface for displaying data associated with communication session events, wherein the triggering comprises displaying data associated with the given sequence of communication session events differently to data associated with other communication session events via the user interface.

12. A method according to claim 11, further comprising:
    storing snapshots of the content of the Markov model at periodic intervals,
    wherein displaying data associated with the given sequence of communication session events via the user interface comprises using the stored snapshot content of the Markov model which occurred closest in time to the given sequence of communication session events in relation to the triggering.

13. A method according to claim 1, further comprising: in response to a further sequence of communication session events being assigned a probability of occurrence metric that exceeds both the predetermined threshold and a further, different predetermined threshold, triggering a further unusual communication session event alert in association with the further sequence.

14. A method according to claim 13, further comprising:
    providing a user interface for displaying data associated with communication session events, wherein the triggering comprises displaying data associated with the given sequence of communication session events differently to data associated with other communication session events via the user interface,
    wherein triggering of the further unusual communication session event alert comprises displaying data associated with the further sequence of communication session events differently to data associated with the given sequence of communication session events and differently to data associated with other communication session events via the user interface.

15. A method according to claim 1, wherein the maintaining comprises maintaining a plurality of different Markov models for events occurring in communication sessions conducted in the network during different time periods.

16. A method according to claim 1, wherein the maintaining comprises maintaining a plurality of different Markov models for events occurring in communication sessions conducted between different groups of subscribers in the network.

17. A method according to claim 1, wherein the Markov model comprises a higher than first-order Markov chain.

18. A method according to claim 11, further comprising: in response to the given sequence of communication session events being assigned a probability of occurrence metric which exceeds the predetermined threshold, triggering an unusual communication session alert in association with a given communication session in which the given sequence occurred, wherein the triggering of an unusual communication session alert comprises displaying data associated with the given communication session differently to data associated with other communication sessions via the user interface.

19. A method according to claim 11, further comprising:
    calculating the average of the probability of occurrence metrics assigned to all events sequences in a further communication session; and in response to the calculated average exceeding a yet further predetermined threshold, triggering a further unusual communication session alert in association with the further communication session, wherein the triggering of the further unusual communication session alert comprises displaying data associated with the further unusual communication session differently to data associated with other communication sessions via the user interface.

20. A method according to claim 1, further comprising:
storing snapshots of the content of the Markov model at periodic intervals;
calculating, for all pairs of two events in a given stored snapshot and the maintained Markov model, the average difference between the surprisal of the probability of the next event in each sequence of two events given the previous event in each sequence of two events divided by the entropy of the previous event in each sequence of two events; and
in response to the calculated average difference exceeding a given predetermined threshold, triggering an abnormal network behavior alert for the network.

21. A method according to claim 11, further comprising:
identifying a subset of event sequences in the plurality of event sequences for which the assigned probability of occurrence metric is higher than other event sequences; and
triggering a further abnormal network behavior alert for the network, wherein the triggering of a further abnormal network behavior alert comprises only displaying data associated with event sequences in the subset via the user interface.

22. A method according to claim 21, further comprising: displaying data associated with event sequences in the subset via the user interface using a word cloud diagram.

23. An apparatus for use in detecting errors in communication sessions in a telecommunications network, the apparatus comprising at least one processor, and at least one memory including computer program code, the at least one memory and the computer program code being configured to, with the at least one processor, cause the apparatus to:

maintain a Markov model for events occurring in communication sessions conducted in the network, the maintaining comprising assigning a probability of occurrence metric to a plurality of event sequences in the conducted communication sessions;

update the content of the Markov model by applying a weighting factor over time; and in response to a given sequence of communication session events being assigned a probability of occurrence metric which exceeds a predetermined threshold, trigger a unusual communication session event alert in association with the given sequence.

24. A computer program product comprising a non-transitory, computer-readable storage medium having computer readable instructions stored thereon, the computer readable instructions being executable by a computerized device to cause the computerized device to perform a method for detecting errors in communication sessions in a telecommunications network, the method comprising:

maintaining a Markov model for events occurring in communication sessions conducted in the network, the maintaining comprising assigning a probability of occurrence metric to a plurality of event sequences in the conducted communication sessions;

update the content of the Markov model by applying a weighting factor over time; and in response to a given sequence of communication session events being assigned a probability of occurrence metric which exceeds a predetermined threshold, triggering a unusual communication session event alert in association with the given sequence.

* * * * *